United States Patent [19]
McElroy

[11] Patent Number: 4,729,932
[45] Date of Patent: Mar. 8, 1988

[54] FUEL CELL WITH INTEGRATED COOLING WATER/STATIC WATER REMOVAL MEANS

[75] Inventor: James F. McElroy, Suffield, Conn.

[73] Assignee: United Technologies Corporation, Hartford, Conn.

[21] Appl. No.: 916,584

[22] Filed: Oct. 8, 1986

[51] Int. Cl.⁴ .................. H01M 8/04; H01M 8/06
[52] U.S. Cl. ............................ 429/34; 429/39; 429/30; 429/13
[58] Field of Search .............. 429/34, 38, 26, 39, 429/30, 12, 41, 13, 25

[56] References Cited

U.S. PATENT DOCUMENTS

| | | |
|---|---|---|
| 3,370,984 | 2/1968 | Platner ................................ 429/13 |
| 3,479,224 | 11/1969 | Jager .................................... 429/26 |
| 3,823,038 | 7/1974 | Gidaspow et al. .................. 429/34 |
| 4,007,058 | 2/1977 | Nelson et al. ...................... 429/34 |
| 4,085,255 | 4/1978 | Grave et al. ........................ 429/26 |
| 4,345,008 | 8/1982 | Breault ................................ 429/26 |
| 4,463,068 | 7/1984 | Cohn et al. ......................... 429/34 |
| 4,476,198 | 10/1984 | Ackerman et al. ................. 429/32 |
| 4,522,895 | 6/1985 | Shigeta et al. ..................... 429/44 |
| 4,543,303 | 9/1985 | Dantowitz et al. ................. 429/34 |

Primary Examiner—Anthony Skapars
Attorney, Agent, or Firm—Alan C. Cohen

[57] ABSTRACT

A fuel cell incorporating a novel gas/water separator which includes a porous hydrophilic structure which allows the passage of liquid water but denies the passage of oxygen gas.

6 Claims, 4 Drawing Figures

FUEL CELL WITH INTEGRATED COOLING WATER/STATIC WATER REMOVAL MEANS

TECHNICAL FIELD

The invention relates to electrochemical fuel cells, more particularly to electrochemical fuel cells using $H_2$ and $O_2$ as reactant gases.

BACKGROUND OF THE INVENTION

Fuel cells within which oxygen and hydrogen gas are used to produce electrical current are well known to the art. Typically, these fuel cells are comprised of a plurality of individual fuel cells each individual fuel cell including an anode chamber having a porous anode, and a cathode chamber having a hydrophobic porous cathode separated by an electrolyte "plate" (this may be an acid, an alkali or a solid polymer, electrolytic membrane) contained within a fuel cell housing.

As an example, electricity is generated in an acid fuel cell by the disassociation of hydrogen within the anode located on the surface of the electrolyte plate to form hydrogen ions and free electrons. The ions pass through the electrolyte plate to the cathode located on the opposite surface of the electrolyte plate, and the free electrons pass via suitable means to one terminal of the fuel cell. The cathode is similarly connected to the other terminal of the fuel cell from which free electrons are supplied and used to reduce oxygen gas. An additional and important by-product of fuel cells using solid polymer electrolyte membrane is that they produce liquid water on the surface of the cathode.

The formation of water at the cathode in such cells is undesirable as the liquid water tends to form a film which blocks further contact of oxygen passing through the cathode chamber with the surface of the cathode and reacting with the migrating hydrogen ions, which acts to decrease the electrical power production of the fuel cell. To alleviate this difficulty several methods have been developed to remove the water formed at this cathode surface. One method is to ensure a high flow rate of oxygen gas which, by virtue of the flow rate, acts to remove water on the surface of the cathode and to remove any entrained water within the cathode chamber. A second method of removing water is by use of a wick of fibrous material placed against the cathode surface. This wick, which is typically in the form of a flat braid, collects the water droplets formed on the surface of the cathode, and by virtue of capillary action of the fibers, draws off the liquid water formed in an individual fuel cell to a separate water reclamation chamber or system. Such a chamber or system may be situated at one end of the fuel cell or outside the fuel cell itself. In a third method disclosed in commonly assigned U.S. Pat. No. 4,543,303, (the contents of which are incorporated herein by reference) a novel fuel cell structure including an assembly for the withdrawal of liquid water formed in solid polymer electrolyte hydrogen/oxygen fuel cells is disclosed. There, a manifold assembly which includes a wettable porous valve metal is described. There, the individual fuel cells are oriented in a vertical orientation and connected to a common fluid exhaust manifold which includes an assembly to separate liquid water from the fuel oxygen gas. Therein, water formed at the cathode flows down the surface of the cathode due to gravitational forces and is separated within the manifold by the wettable porous valve metal. Although this is an improvement over the two prior disclosed methods used to withdraw liquid water from individual fuel cells, there remains a continuing need in the art for further devices useful for effectively removing liquid water formed in individual fuel cells.

DISCLOSURE OF THE INVENTION

A fuel cell comprised of individual fuel cells each having a barrier plate bounding the individual fuel cell, an anode chamber, a cathode chamber, a solid polymer electrolyte membrane having the cathode and anode intimately contacting opposite surfaces of the membrane and separating the anode and cathode chambers, and a gas/water separator which includes a porous hydrophilic structure associated with the cathode chamber and bounding the other side of the individual fuel cell. The porous hydrophilic structure is permeable to liquid but impermeable to gas flow at gas pressures below a "bubble pressure P" which is related to the pore size of the structure by the relationship $$P = \frac{2 \text{ (surface tension)}}{\text{(pore radius for individual circular pores)}}$$

Other features and advantages of this invention will become more apparent from the specification and claims and from the accompanying drawings which illustrate several embodiments of the invention.

BEST MODE FOR CARRYING OUT THE INVENTION

Figure 1:
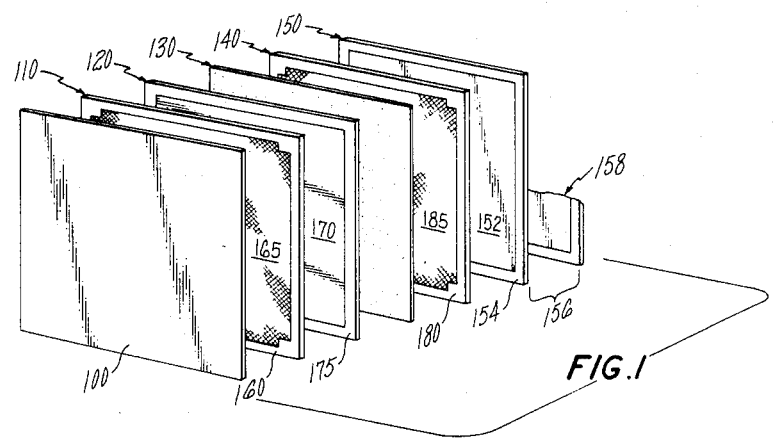
FIG. 1 shows an exploded view of a fuel cell utilizing the invention showing an anode, cathode, electrolyte membrane and one embodiment of the invention, a gas/water separator.

FIG. 1 shows an expanded view of an individual fuel cell having two ends, "boundaries", including a barrier plate 100 bounding one side of the individual fuel cell, an anode chamber 110, an electrolyte plate 120, a sheet of "wet-proof" carbon paper 130, a cathode chamber 140 and one embodiment of the invention, a gas/water separator 150 bounding the other side of the fuel cell. The anode chamber 110 is preferably constructed so to include an assembly frame 160 surrounding a metal mesh 165, both of which are preferably made of zirconium, which exhibits excellent resistance to hydrogen embrittlement, although other metals such as niobium or tantalum may be used. The assembly frame 160 and the metal mesh 165 may be approximately about 5 mils thick. The anode chamber is typically supplied fuel gas, here hydrogen gas, via an inlet means (not shown) by a hydrogen feed manifold (not shown) communicating with an inlet means in the assembly frame 160 and an exhaust gas manifold (not shown) communicating with an outlet means (now shown) in the assembly frame 160 which withdraws spent fuel gas.

The boundaries of the anode chamber 110 itself are formed by the assembly frame 160, the barrier plate 100 and the electrolyte membrane 120, the barrier plate 100 bounding one side of the anode chamber. The barrier plate is preferably made of pure zirconium as the one side of it will be in intimate contact with the anode chamber and with the fuel gas. It too should have excellent resistance to hydrogen embrittlement and again zirconium is preferred, although other metals such as niobium or tantalum may be used.

The electrolyte membrane (solid polymer electrolyte) 120 preferably includes a sulfonated fluorocarbon cation exchange membrane, which includes one sold by the DuPont Company under trademark Nafion TM. Such membranes are especially useful as they contain a fluocarbon backbone to which sulfonic acid functional groups are attached. These functional groups act as excellent ion exchange sites and are thus especially useful in fuel cells. This membrane 170 is contained within an electrolyte frame 175.

The two electrodes of the individual fuel cells are located on opposite surfaces of the membrane 170 and are preferably bonded agglomerates of catalytic platinum group metals and a polymeric binder. Preferably, the catalytic particles are platinum black, and the polymeric binder is polytetrafluorolethylene which is selected for its hydrophobic nature. The construction and selection of materials are conventional and known to those skilled in the art.

The anode and cathode electrodes are formed in the following manner. First, powders of catalytic platinum and the polymeric binder, which are mixed and placed on one side of the membrane 170. Then, a thin foil of titanium is placed over this mixture situated on the membrane and the particles are bonded to one another and to the membrane by the application of heat and pressure. The pressure which has been found suitable is not critical to the application but 400–1,000 psi with a pressure preferably of approximately 800 psi is preferred. Similarly, the temperature required is not critical and may vary from about 200° F. (93.3° C.) to about 600° F. (315.5° C.). The time of the treatment may vary from about 0.5 minutes to about 10 minutes with a time of about 3 to about 5 minutes being preferred. The preferred pressure, temperature and time is determined for each application as the condition at which the binder particles are sintered together with the catalytic particles, and this may be readily determined by experiment. In this manner, a gas and liquid pervious anode electrode may be formed in intimate contact with the electrolyte plate.

The cathode side of the electrolytic plate 105 includes an electrode which is similarly formed but further includes a sheet of "wet-proof" carbon paper. This sheet is approximately 10 mils thick and is fabricated of carbon and a hydrophobic binder such as polytetrafluoroethylene. These materials are preferred as carbon readily carries electrical current and the hydrophobic nature of polytetrafluoroethylene repels water. Such a "wet-proof" carbon sheet may be bonded to the cathode on the electrolyte plate in a similar fashion to that incorporated in bonding the polymeric binder and the catalytic platinum to form the anode electrolytic plate. In this case however, the polymeric binder and the catalytic platinum particles, again polytetrafluoroethylene and platinum black particles are dispersed upon the cathode side of the membrane 170, then covered with a layer of "wet-proof" carbon paper. The cathode side of the membrane is then subjected to heat and pressure within the ranges of time, pressure and temperature outlined above for the formation of the anode electrode. It is preferred that the sheet of "wet-proof" carbon paper be positioned on the cathode side of the electrolytic plate as it is on this surface that the waste product, liquid water, forms in the electrochemical reaction. The presence of the "wet-proof" carbon and the hydrophobic polymeric binder particles in intimate contact with the cathode surface of the membrane and with the catalyst particles have two beneficial advantages. Foremost the formation of water at this surface, which is the result of the electrochemical reaction, is quickly repelled from the surface of the membrane and the cathode surface and through the sheet of carbon paper to its surface away from the membrane. This prevents the undesirable condition known as "flooding" of the cathode which prevents contact of the oxygen gas with the cathode and reduces operating efficiency. The second advantage is the ability of the combination of the cathode, and the carbon sheet to form a current carrying structure which acts as the cathode electrode of the fuel cell.

The cathode chamber 140 is similar to the anode chamber and includes an assembly frame 180 surrounding a metal mesh 185. Preferably both are fabricated of niobium although other metals such as zirconium and tantalum may be used. Niobium is preferred as other metals may show unacceptable degradation in an oxygen/liquid water environment. The assembly frame 180 similarly includes inlet and outlet means (not shown) through which fresh oxidant and exhaust gas may be respectively supplied and removed from the cathode chamber 140 containing the metal mesh 185. The inlet and outlet means are in communication with an oxygen feed manifold and an exhaust gas manifold (not shown) by which oxygen feed gas and exhausted gas are respectively supplied and withdrawn. The boundaries of the cathode chamber itself 140 are formed by the assembly frame 180, the "wet-proof" carbon sheet 130 and the gas/water separator 150 which includes a hydrophobic porous valve metal plate 152 within an assembly frame 154.

The hydrophobic porous valve metal plate 152 contains passages, "pores", which pass through the valve metal plate. These pores may have an average nominal circular diameter of about 0.25 to about 10 microns, preferably an average nominal circular diameter of between about 2 and about 3 microns. Further, the maximum pore size of any pore within the valve metal plate must fall within the desired range of pore sizes.

This gas/water separator permits the passage of water but prevents the passage of gas through the pores below a certain critical pressure differential across the gas/water separator customarily identified as the "bubble pressure P". This "bubble pressure, P" is related to the pore size of the gas/water separator by the equation:

$$P = \frac{2 \text{ (surface tension)}}{\text{(pore radius for nominally circular pores)}}.$$

The average nominal circular pore diameter of the gas water separator should be chosen so to maintain a bubble pressure which establishes a differential pressure between the cooling water stream and the cathode plate pressure of approximately 3 psi, with the higher pressure being at the cathode chamber. This assures that the porous gas water separator will not pass gas from the cathode chamber out of the individual fuel cell across the gas/water separator and into a cooling stream, but will pass only the liquid water formed in the individual fuel cell by the electrochemical reaction.

The hydrophilic porous valve metal plate 152 may be constructed of any material which may contain such pores and withstand the operating conditions of the fuel cell. Preferably, the material is a sintered niobium plate which exhibits acceptable resistance to degradation in an oxygen/liquid water environment and exhibits acceptable heat transfer characteristics and may thus act as a gas/water separator and provide good heat transfer between the individual fuel cell and the cooling stream. However, other metals such as titanium, zirconium, and tantalum may be used.

As seen in FIG. 1, the gas/water separator, as shown, communicates directly with the cathode chamber at the surface opposite from the "wet-proof" carbon paper 130. By use of the invention then, water passing from the "wet-proof" carbon paper 130 may pass through the metal mesh 165 contained within the cathode chamber 140 and onto the surface of the gas/water separator 150 where it is readily transmitted through the gas/water separator plate 150 and to the opposite side away from the cathode of the individual fuel cell. Preferably, the gas/water separator communicates directly with a stream of cooling water in a cooling chamber 156, which is formed at one side by the gas/water separator 150 and by another plate which may be the gas/water separator of another individual fuel cell 158 as shown (partially broken away) or may be another plate, such as a barrier plate or any other structure which may be used to confine the cooling stream. The cooling chamber 156 is supplied with cooling water by a cooling supply manifold (not shown) and a cooling exhaust manifold (not shown) withdraws cooling water from the cooling chamber. In this manner by use of the disclosed invention, the fuel cell may be simultaneously cooled by the current of water passing through the fuel cell by the cooling stream, and any water formed by the electrochemical reaction and passing through the gas/water separator may pass directly into the cooling stream.

Figure 2:
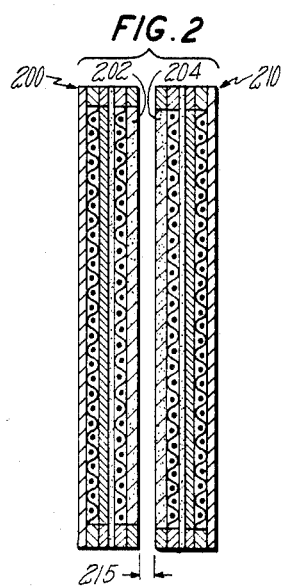
FIG. 2 shows a cross section of a fuel cell utilizing the invention in an assembly having a common cooling liquid chamber situated between adjacent fuel cells.

FIG. 2 shows an alternative embodiment showing two individual fuel cells 200, 210 wherein the gas/water separators in each 202, 204 are oriented in parallel and have a gap therebetween, thus forming a cooling chamber 215 through which a cooling stream may be passed.

Figure 3:
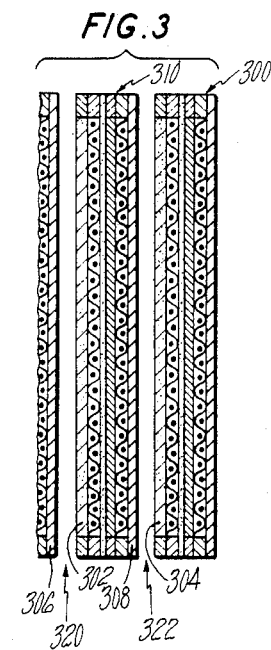
FIG. 3 shows an embodiment of the invention used within a fuel cell having an individual cooling liquid chamber situated between individual fuel cells.

FIG. 3 shows yet another alternative embodiment of the invention showing individual fuel cells 310, 320 incorporating gas/water separators 302, 304 which are parallel to the barrier plates 306, 308 of a series of individual fuel cells and forming gaps 320, 322 between one gas/water separator and the barrier plate of the next individual fuel cell, which form cooling chambers through which the cooling stream may be passed.

Figure 4:
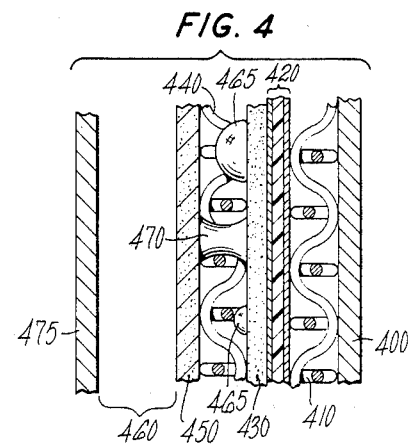
FIG. 4 shows a detailed view of a portion of an individual fuel cell including an embodiment of the invention, and further showing water droplets formed upon the cathode surface including one water droplet "spanning" across the cathode chamber between the gas/water separator and the cathode surface.

FIG. 4 shows a detailed view of the operation of the invention. FIG. 4 shows part of an individual fuel cell including portions of a barrier plate 400, anode chamber 410, electrolyte membrane 420, "wet-proof" carbon sheet 430, cathode chamber plate 440, a gas/water separator 450, a cooling chamber 460 formed by the gas/water separator 450 and another plate 470 which may be either a barrier plate of the next individual fuel cell in accordance with the example of FIG. 3 or may be another gas/water separator of the next individual fuel cell in accordance with the example of FIG. 2. Within the cathode chamber 440 are shown the formation of two water droplets 465 upon the surface of the "wet-proof" carbon sheet 430 and shows the "span" of one water droplet 470 through the metal mesh of the cathode chamber and onto the surface of the gas water separator plate. The "wet-proof" carbon sheet acts to "bead" on its surface and the droplets increase in size within the cathode plate until the water droplet's radius is approximately equal to the thickness of the metal mesh of the cathode chamber. Once such a radius size is reached, the water droplet then "spans" the gap and, by virtue of the unique properties of the gas/water separator plate, water quickly passes through the gas/water plate and into the cooling chamber 460.

It can be seen from the description above that a simple and effective cell gas water separator which is integral with fuel cell cooling means has been provided. This separator eliminates the need for external separation devices reducing the complexity of the fuel cell and fuel cell assembly or for separate water collection or withdrawal manifolds. Further, unlike other systems used in cooling fuel cells and in separating product water formed by the electrochemical reaction, this novel device may be incorporated in a fuel cell to be ultimately used in a zero gravity environment. This is due to the nature of the construction of the fuel cell and the use of the invention whose operation is independent of gravitational forces, and be used in a fuel cell which will operate regardless of spatial orientation or the presence or absence of gravity.

While the invention has been described in the most preferred method above, it is by no means limited to that description and other embodiments falling within the scope and spirit of the invention are considered to be part of the invention.

I claim:

1. A fuel cell comprising at least one individual fuel cell, each individual fuel cell comprising:
   (a) a barrier plate bounding one side of the individual fuel cell,
   (b) an anode chamber,
   (c) a solid polymer electrolyte membrane having two opposite surfaces separating the anode chamber from a cathode chamber,
   (d) an anode within the anode chamber in intimate contact with one surface of the solid polymer electrolyte membrane,
   (e) a cathode in intimate contact with the other surface of the solid polymer electrolyte membrane,
   (f) a structure of a hydrophobic porous material in intimate contact with the cathode,
   (g) a cathode chamber,
   (h) a gas/water separator associated with the cathode and bounding the other side of the individual fuel cell wherein the gas/water separator includes a porous, hydrophilic structure which is permeable to liquid but impermeable to gas flow at gas pressures below the "bubble pressure P" of the porous hydrophilic structure wherein the "bubble pressure P" is related to the pore size of the structure by the relationship $$P = \frac{2 \text{ (surface tension)}}{\text{(pore radius for nominally circular pores)}}.$$

2. A fuel cell as in claim 1 having at least two individual fuel cells, wherein the two individual fuel cells have adjacent gas/water separators and have a gap therebetween forming a cooling chamber.

3. A fuel cell as in claim 1 having at least two individual fuel cells wherein the barrier plate of one individual fuel cell is adjacent to the gas/water separator of the other individual fuel cell and has a gap therebetween forming a cooling chamber.

4. A fuel cell as in claim 2 wherein the cooling chamber communicates with a means for supplying cooling liquid and a means for withdrawing cooling liquid.

5. A fuel cell as in claim 3 wherein the cooling chamber communicates with a means for supplying cooling liquid and a means for withdrawing cooling liquid.

6. A method of removing liquid water from the cathode of a fuel cell by providing:
   (a) a barrier plate bounding one side of the individual fuel cell,
   (b) an anode chamber,
   (c) a solid polymer electrolyte membrane having two opposite surfaces separating the anode chamber from a cathode chamber,
   (d) an anode within the anode chamber in intimate contact with one surface of the solid polymer electrolyte membrane,
   (e) a cathode in intimate contact with the other surface of the solid polymer electrolyte membrane,
   (f) a structure of a hydrophobic porous material in intimate contact with the cathode,
   (g) a cathode chamber,
   (h) a gas/water separator associated with the cathode and bounding the other side of the individual fuel cell wherein the gas/water separtaor includes a porous, hydrophilic structure which is permeable to liquid but impermeable to gas flow at gas pressures below the "bubble pressure P" of the porous hydrophilic structure wherein the "bubble pressure P" is related to the pore size of the structure by the relationship $$P = \frac{2 \text{ (surface tension)}}{\text{(pore radius for nominally circular pores)}}.$$

* * * * *